Patented Mar. 13, 1951

2,544,695

UNITED STATES PATENT OFFICE 2,544,695

PROCESS FOR MAKING ULTRAMARINE PIGMENT

Charles A. Kumins, Tuckahoe, N. Y., assignor to Interchemical Corporation, New York, N. Y., a corporation of Ohio No Drawing. Application October 8, 1947, Serial No. 778,731

10 Claims. (Cl. 106—305)

This invention relates to ultramarine blue and aims to provide a new and economical method for its production.

Ultramarine blue is a sulfur containing sodium aluminum silicate having a crystal structure closely resembling that of the zeolites. The blue color is attributed to the presence of sulfur complexes in the crystal lattice. It is widely used as a blue pigment in paints, inks, paper, etc.

Ultramarine blue is produced commercially by calcining, under various conditions and in various types of apparatus, an intimate mixture of china clay with about an equal weight of sodium carbonate and/or sodium sulfate and sulfur and with a small amount of carbonaceous material such as pitch, rosin or charcoal. A small amount of silica is also sometimes included in the mixture. The ingredients and proportions are often varied in order to obtain products having different properties. For example, when sodium sulfate with no sodium carbonate is used, a weak, greenish product which is low in hiding power and poor in acid resistance is obtained, and when sodium carbonate with no sodium sulfate is used, together with some silica and a high percentage of sulfur, a dark, reddish-blue product with improved hiding power and acid resistance is obtained.

In one method the mixture is calcined, with exclusion of air, in covered, cylindrical or tapered fire-clay or other refractory crucibles placed one upon another in a temperature "between red and white heat." This operation produced green ultramarine. The exact weight and temperature of the calcination depend upon the ingredients and the proportions of ingredients, the size and shape of the crucibles, the dimensions of the furnace, etc. At the end of the calcination the furnace is allowed to cool, which process generally takes from 2 to 3 days. The crucibles are then removed and the fused ultramarine green is crushed and dry-milled in revolving barrels, ball mills, cone mills or pulverizers, etc., and screened to remove coarse particles. The ultramarine green is then intimately mixed with from about 7% to 10% of finely ground sulfur and roasted at "a medium red to a bright red heat" in a muffle, retort, cylindrical or other type furnace. The sulfur, instead of being preliminarily mixed with the ultramarine green, may be added intermittently during the roasting operation. It melts and burns as air is admitted, sulfur dioxide is formed and escapes, and the green color gradually changes to blue. The roasting operation takes 2 or 3 days, or longer. The roasted blue product is finally lixiviated to remove soluble salts, wet-milled, dried and dry-milled.

In another method, often called the direct process, the mixture is calcined, with some admission of air, either in covered crucibles or pots, placed one upon another in a muffle furnace, or simply spread upon the floor of the muffle. When operating according to this method the furnace is slowly heated to about 800° C. and maintained at this temperature until a withdrawn test sample indicates that the operation is finished. The furnace is then closed and allowed to cool. The heating period usually extends over from 24 to 36 hours and the cooling period usually extends over from 6 to 8 days.

These methods have certain inherent disadvantages. They are very time-consuming, often requiring from 10 to 14 days, or longer, to obtain the finished product, and they are difficult to control. They result in the formation of hard, fused masses. In both methods the process includes the formation of a zeolite by fusing china clay with sodium carbonate and/or sodium sulfate, the simultaneous formation of sodium polysulfide by reaction of sulfur and sodium carbonate and/or sodium sulfate under reducing conditions, and the simultaneous reaction of the zeolite with polysulfide. At this high temperature of formation of zeolite the structure is compacted and less susceptible to the entrance of the rather large polysulfide linkage into the crystal lattice. The polysulfide formation reaction is an equilibrium one and excess sulfur is required for the formation of the desirable higher polysulfides, $Na_2S_3$, $Na_2S_4$, etc. Under the high temperature conditions of the operation required for the reduction of sodium carbonate and/or sodium sulfate, these higher sulfur content polysulfides may not form, due to the loss of sulfur by volatilization. It is believed that the intensity of blue color and tinting strength of the pigment depend at least in part upon the amount of sulfur carried into the crystal lattice by the sodium, and that therefore the formation of higher polysulfides is extremely important.

In my method the zeolite starting material is formed by first calcining a clay of the type suitable in the old process for the formation of ultramarine blue followed by digesting the calcined clay with caustic. I prefer to start with a china clay of the sort now commonly employed for making ultramarine. I calcine this clay at a temperature between 550° C. and 950° C. for a period of one to three hours. A somewhat longer period may be used but I have found that little additional advantage is gained by the longer period. I then digest the calcined clay with a caustic solution such as 10% caustic soda. A considerable excess of caustic is desirable in order to hasten the reaction. I have found that optimum results are obtained by using approximately 50% alkali in excess of that necessary to convert the alumina of the clay to sodium aluminate. The excess can be employed in the next batch.

Although the causticized calcined clay may be substituted for the corresponding china clay and part of the soda ash used in the conventional process, I have found that still better results can be obtained by conducting the operation in two steps. In the first, the specially prepared clay is mixed with sulfur with a sodium sulfide or a compound that forms a sodium sulfide under the conditions of the operation and heated in a non-oxidizing atmosphere at temperatures above 600° C. preferably from 750° C. to 900° C. for twenty minutes to three hours. The temperature is then preferably reduced to about 500° C. to 600° C. and the atmosphere changed to oxidizing. It is also preferred that oxides of sulfur be present in the atmosphere. After a period of one-half to three hours under these conditions, the material may be cooled either slowly or by quenching, washed and ground.

I may also employ an alkali metal (preferably sodium) organic salt. I have found that sodium citrate, sodium oxalate, sodium acetate and sodium propionate are all useful for this purpose. While organic salts having a relatively high carbon to sodium ratio such as the soaps, are also useful, they require additional amounts of sulfur which carries away the excess carbon as carbon disulfide.

Other alkali and alkaline-earth metals may be substituted for sodium in the process set forth. While the sodium salts generally produce at least as good products as any of the other metal salts as well as being the cheapest, acceptable colors can be produced with any of the indicated metal salts.

In order to facilitate improved mixing of the materials employed, I find that small additions, of the order of 1% to 5% of a polar-non-polar compound such as a soap e. g., sodium resinate or sodium lignin sulfonic acid during the mixing operation are desirable. The mixing can be done in any of the simpler devices such as a ball or pebble mill or a muller. Use of a sodium soap serves a double purpose both as a mixing acid and as a reactant.

The addition of small amounts of finely divided silica such as diatomaceous earth has been found to effect an improvement in some clays. I have found that about 25% on the weight of the calcined uncausticized clay is the best amount to use. Whenever 30% is used, the improvement drops off rapidly; 35% is no better than none at all. Lesser amounts than 25% are proportionately less helpful.

Ultramarine blue made by my improved process is softer and is ground more easily to maximum tinting strength than the best available product. It is also brighter and possesses up to 80% greater tinting strength.

Examples of my process follow:

Example I 226 pounds of china clay are calcined at 800° C. for a 3 hour period. After cooling to room temperature the calcined clay which now weighs only 200 pounds due to loss of constitutional water is discharged into 200 gallons of a 10% NaOH solution and then heated to the boiling point (circa 104° C.) and refluxed for 16 hours with vigorous agitation. The resulting product is filtered, washed free of excess caustic and dried. The finished material now weighs 243 pounds and upon analysis is found to contain Na2O and also to have ion exchange properties. For example a 2 gram sample of the calcined caustic clay was able to exchange 1.02 gram of Ag+ over a 24 hour period. Analysis of the product before and after the calcination and caustization gave the following results:

|  | Original Clay | Calcined Causticized Clay |
|---|---|---|
|  | Per cent | Per cent |
| $SiO_2$ | 44.4 | 39.1 |
| $Al_2O_3$ | 39.9 | 30.8 |
| $Na_2O$ | Trace | 18.1 |
| $H_2O$ | 13.0 | 12.0 |

Example II 226 pounds of china clay is calcined for 3 hours at 700° C. and then upon cooling it is refluxed with 200 gallons of 10% KOH containing 60 pounds of diatomaceous earth for a 16 hour period. The resulting product is filtered, washed free of excess alkali and dried.

Example III 226 pounds of kaolin is calcined for 1 hour at 800° C. and then upon cooling it is discharged into a suitable container and refluxed with 200 gallons of 10% LiOH solution for 14 hours. The resulting product is then washed free of excess alkali and dried.

Example IV 226 pounds of china clay are calcined for 3 hours at 775° C. and then upon cooling the batch is discharged into 200 gallons of 10% NaOH containing 60 pounds of diatomaceous earth. The vessel is heated to reflux temperature (about 104° C.) and held there for 16 hours after which the product is washed free of excess alkali by decantation, filtered and then dried.

Example V 55 pounds of the product obtained from Example I are mixed with 78 pounds sulfur, 1.5 pounds sodium lignin sulfonate, and 14 pounds anhydrous sodium acetate in a porcelain mill for a 3 hour period. The powder is then charged into a muffle furnace at 500° C. The temperature is raised to 800° C. and held there for ½ hour after which the reduced ultramarine is cooled to 500° C. and held at this temperature for 3 hours while introducing a mixture of air and sulfur dioxide. The calcined product is discharged into water, washed by decantation until substantially free of water soluble salts, wet milled in a porcelain ball mill, washed and dried.

Example VI 55 pounds of the product obtained from Example IV are mixed and treated in a manner exactly the same as described in Example V.

Example VII 55 pounds of the product from Example II are mixed with 20 pounds of potassium acetate, 78 pounds of sulfur and 1.5 pounds sodium resinate in the same manner as described above.

The powder is then treated as previously described.

Example VIII 55 pounds of the product from Example IV was mixed with 22 pounds of commercial sodium citrate, 78 pounds of powdered sulfur and 1.5 pounds of sodium resinate in a tumbler for 3 hours. Further treatment previously described.

Example IX 55 pounds of product from Example III are mixed in a drum with 20 pounds lithium citrate, 78 pounds powdered sulfur and 1.5 sodium resinate for 2 hours. Subsequent treatment the same as in other examples.

Example X 55 pounds of product from Example I are mixed with 56 pounds of commercial sodium stearate, 312 pounds of finely powdered sulfur in a tumbler for 4 hours. The resulting powder is then treated in the manner described previously.

Example XI 55 pounds of product from Example I are mixed with 12 pounds of finely powdered commercial sodium monosulfide, 125 pounds of sulfur powder and 2 pounds of sodium resinate in a porcelain ball mill for 8 hours. The resulting product is charged into a muffle furnace, heated to 850° C. and held at that temperature for 2 hours after which it is cooled to 500° C. and oxidized with air—sulfur dioxide mixtures for 3 hours. The oxidized product is then quenched in water, washed free of water soluble salts by decantation, wet milled and then filtered and dried.

Example XII 55 pounds of product from Example IV are mixed with 20 pounds of commercial sodium polysulfide, 78 pounds of sulfur, 1.5 pounds sodium lignin sulfonate in a tumbler for 7 hours. The resulting powder is then treated as in Example XI.

Example XIII 55 pounds of the product obtained in Example I are mixed with 78 pounds sulfur, 1.5 pounds sodium lignin sulfonate and 14 pounds anhydrous sodium acetate in a porcelain mill for 3 hours. The mixture is then put into a muffle furnace at 500° C. The temperature is raised slowly to 800° C. and held for half an hour. The temperature is allowed to drop to 750° C. and is held there for 1 hour while introducing nitric oxide mixed with a little air. The calcined product is washed and milled as in Example V.

Obviously many variations may be introduced into the production of ultramarine within the spirit of my disclosure and it is to be understood that my invention is limited only by the scope of the claims that follow.

I claim:

1. The method of obtaining an ultramarine blue which comprises calcining clay at 550° C. to 950° C., digesting the calcined product with caustic soda in excess of that required to convert all of the alumina of the clay to sodium aluminate, washing, preparing an intimate mixture in proportions sufficient to produce an ultramarine blue, of the washed product, sulfur and an alkali metal salt of an aliphatic carboxy acid, heating under reducing conditions for at least one and one-half hours at a temperature of the order of 600° C. to 900° C., lowering the temperature to 500° C. to 600° C. and maintaining such temperature in an oxidizing atmosphere and in the presence of oxides of sulfur for at least one hour, and cooling and washing the product.

2. The method of obtaining an ultramarine blue which comprises calcining clay at 550° C. to 950° C., digesting the calcined product with caustic soda in excess of that required to convert all of the alumina of the clay to sodium aluminate, washing, preparing an intimate mixture in proportions sufficient to produce an ultramarine blue, of the washed product, sulfur and a sodium polysulde, heating under reducing conditions between 750° C. and 900° C., for from twenty minutes to three hours, lowering the temperature to 500° C. to 600° C. and maintaining such temperature in an oxidizing atmosphere and in the presence of oxides of sulfur for at least one hour, and cooling and washing the product.

3. The method of obtaining an ultramarine blue which comprises calcining clay at 550° C. to 950° C., digesting the calcined product with caustic soda in excess of that required to convert all of the alumina of the clay to sodium aluminate, washing, preparing an intimate mixture in proportions sufficient to produce an ultramarine blue, of the washed product, sulfur, an alkali metal salt of an aliphatic carboxy acid and finely divided silica in an amount up to 30% based on the weight of the calcined clay, heating under reducing conditions for from one to three hours at 750° C. to 900° C., lowering the temperature to about 550° C. and maintaining such temperature in an oxidizing atmosphere and in the presence of oxides of sulfur for at least one hour, and cooling and washing the product.

4. The method of obtaining an ultramarine blue which comprises calcining clay at 550° C. to 950° C., digesting the calcined product with caustic soda in excess of that required to convert all of the alumina of the clay to sodium aluminate, washing, preparing an intimate mixture in proportions sufficient to produce an ultramarine blue, of the washed product, sulfur and sodium acetate, heating under reducing conditions at about 800° C. for between twenty minutes and three hours, lowering the temperature to 500° C. to 600° C. and maintaining such temperature in an oxidizing atmosphere and in the presence of oxides of sulfur for at least one hour, and cooling and washing the product.

5. The method of obtaining an ultramarine blue which comprises calcining clay at about 800° C., digesting the calcined product with caustic soda in excess of that required to convert all of the alumina of the clay to sodium aluminate, washing, preparing an intimate mixture in proportions sufficient to produce an ultramarine blue, of the washed product, sulfur, sodium acetate and silica up to 30% based on the weight of the calcined clay, heating under reducing conditions to about 850° C. for thirty minutes to three hours, lowering the temperature to about 500° C. and maintaining such temperature in an oxidizing atmosphere and in the presence of oxides of sulfur for about one hour, and cooling and washing the product.

6. The method of obtaining an ultramarine blue which comprises calcining clay at about 800° C. for one to three hours, digesting the calcined product with caustic soda in excess of that required to convert all of the alumina of the clay to sodium aluminate, washing, preparing an intimate mixture in proportions sufficient to produce an ultramarine blue, of the washed product, sulfur and sodium acetate, heating under reducing conditions to about 850° C. for about one hour, lowering the temperature to 500° C. to 600° C. and maintaining such temperature in an oxidizing atmosphere and in the presence of oxides of sulfur for about three hours, and cooling and washing the product.

7. The method of obtaining an ultramarine blue which comprises calcining clay at about 800° C. for one to three hours, digesting the calcined product with caustic soda in excess of that required to convert all of the alumina of the clay to sodium aluminate, washing, preparing an intimate mixture in proportions sufficient to produce an ultramarine blue, of the washed product, sulfur, sodium acetate and about 25% silica based on the weight of the calcined clay, heating under reducing conditions for about three hours at about 800° C., lowering the temperature to about 500° C. and maintaining such temperature in an oxidizing atmosphere and in the presence of oxides of sulfur for one to three hours, and cooling and washing the product.

8. The method of obtaining an ultramarine blue which comprises calcining clay at about 800° C., digesting the calcined product with caustic soda in excess of that required to convert all of the alumina of the clay to sodium aluminate, washing, preparing an intimate mixture in proportions sufficient to produce an ultramarine blue, of the washed product, sulfur, sodium sulfide and silica up to 30% based on the weight of the calcined clay, heating under reducing conditions for at least one and one-half hours at 750° to 900° C., lowering the temperature to 500° C. to 600° C. and maintaining such temperature in an oxidizing atmosphere and in the presence of oxides of sulfur for at least one hour, and cooling and washing the product.

9. The method of obtaining an ultramarine blue which comprises calcining clay at 550° C. to 950° C., digesting the calcined product with caustic soda in excess of that required to convert all of the alumina of the clay to sodium aluminate, washing, preparing an intimate mixture in proportions sufficient to produce an ultramarine blue, of the washed product, sulfur and sodium stearate, heating under reducing conditions between 750° C. and 900° C. for from thirty minutes to three hours, continuing heating at 500° C. to 600° C. in an oxidizing atmosphere for at least one-half hour, and cooling and washing the product.

10. The method of obtaining an ultramarine blue which comprises calcining clay at 550° C. to 950° C., digesting the calcined product with caustic soda in excess of that required to convert all of the alumina of the clay to sodium aluminate, washing, preparing an intimate mixture in proportions sufficient to produce an ultramarine blue, of the washed product, sulfur, anhydrous sodium acetate and sodium lignin sulfonate, heating under reducing conditions for at least one hour at 850° C., heating at 750° C. in an oxidizing atmosphere and in the presence of nitric oxide for at least one-half hour and cooling and washing the product.

CHARLES A. KUMINS.

No references cited.